United States Patent [19]

Holroyd et al.

[11] Patent Number: 4,743,322
[45] Date of Patent: May 10, 1988

[54] MOLDING OF ELASTOMERIC MATERIAL COMPONENTS

[75] Inventors: Eric Holroyd, Near Knutsford; James N. McGlashen, Near Wigan; Ronald H. Pointon, Formby, all of England

[73] Assignee: Apsley Metals Limited, United Kingdom

[21] Appl. No.: 862,642

[22] Filed: May 13, 1986

Related U.S. Application Data

[63] Continuation-in-part of Ser. No. 566,990, Dec. 30, 1983, abandoned.

[30] Foreign Application Priority Data

Jan. 15, 1983 [GB] United Kingdom ............... 8301099
Jan. 9, 1986 [GB] United Kingdom ............... 8600452

[51] Int. Cl.$^4$ .................. B29D 30/06; B29C 35/00
[52] U.S. Cl. ...................... 156/123; 156/125; 264/326; 264/501; 425/36; 425/47
[58] Field of Search .......... 156/110.1, 116, 127, 156/285, 286, 394.1, 123; 264/248, 297.5, 326, 501; 425/28 R, 38, 542, 47, 36

[56] References Cited

U.S. PATENT DOCUMENTS

| | | | |
|---|---|---|---|
| 2,497,226 | 2/1950 | McNeill | 156/125 |
| 2,672,914 | 3/1954 | Weigold et al. | 156/125 |
| 2,710,425 | 6/1955 | Rhodes | 156/125 |
| 3,121,947 | 2/1964 | Knox | 425/47 X |
| 3,837,986 | 9/1974 | Görter et al. | 156/125 |
| 3,841,809 | 10/1974 | Tucker | 425/DIG. 47 X |
| 3,925,128 | 12/1975 | Edler | 156/96 |
| 4,057,446 | 11/1977 | Goodfellow | 156/125 X |
| 4,057,447 | 11/1977 | Holroyd et al. | 264/326 X |
| 4,137,033 | 1/1979 | Goodfellow | 425/542 |
| 4,236,883 | 12/1980 | Turk et al. | 425/36 X |
| 4,253,513 | 3/1981 | Larson et al. | 264/501 X |

FOREIGN PATENT DOCUMENTS 349524 5/1931 United Kingdom .
830213 3/1960 United Kingdom .

Primary Examiner—Jerome Massie
Assistant Examiner—Ramon R. Hoch
Attorney, Agent, or Firm—Stevens, Davis, Miller & Mosher

[57] ABSTRACT

A method and an apparatus for making vehicle tires comprising filling a pair of discrete annular tire sidewall molds with uncured sidewall compound bringing the sidewall molds into contact, one on either side of a preshaped green tire carcass, positioning the assembly of sidewall molds and tire carcass in a tire curing mold, curing the tire and removing it from the curing mold and the sidewall mold.

14 Claims, 4 Drawing Sheets

MOLDING OF ELASTOMERIC MATERIAL COMPONENTS

This is a continuation-in-part of application Ser. No. 566,990 filed on Dec. 30, 1983, now abandoned.

This invention relates to the molding of elastomeric material components and in particular to the assembly and molding of vehicle tires.

Conventional tire production processes assemble a plain completely unpatterned tire, known as a green tire (because it is unvulcanized) which is then placed in the mold of a curing press which is closed to finally shape the tire and impress the tire tread pattern and the sidewall patterns upon the green carcass. The tire is retained in the closed press until the heat of the press has effected vulcanization. It is important that the final appearance of the tire and particularly its sidewalls is good so as to be saleable.

Difficulties occur in forming the tire sidewalls in conventional shaping and curing processes due to the appreciable stretch at the radially outer edge when an extruded straight length of sidewall material is assembled to a flat built tire carcass and then shaped up into a toroid. The shaping makes it particularly difficult to maintain the desired sidewall cross-sectional profile especially when the pre-extruded length of sidewall already includes variations in cross-section from its basic longitudinal extrusion process.

These problems have been overcome in proposals to cast tires or to injection mold tires by casting or injecting the sidewalls into a fully shaped toroidal mold but such systems invariably require complex supports for the carcass reinforcement or indeed the design of a tire without a conventional carcass reinforcement.

Nevertheless in the case of many tires the sidewall appearance greatly affects the saleability of the product. Blemishes in the sidewall and, in the case of white sidewall or white lettered tires, any displacement of the components of the mold pattern must be avoided.

It is an object of the present invention to provide means for molding the sidewalls of vehicle tires which are conventionally reinforced tires which improve the sidewall molding with respect to final appearance and consistency of sidewall sectional shape.

According to one aspect of the present invention a method of assembling a vehicle tire comprises filling a pair of discrete annular tire sidewall molds with uncured sidewall compound, bringing the sidewall molds into contact on either side of a preshaped reinforced green tire carcass so as to fit the premolded sidewalls to the carcass, positioning the assembly of sidewall molds and tire carcass in a tire curing mold, curing the tire and removing it from the curing mold and the sidewall molds.

The sidewall molds may be used to support or to assist in supporting the carcass for storage and handling between the sidewall fitting stage and the final curing operation. Furthermore the tire bead regions may be engaged by and supported by extensions in the sidewall molds.

Various methods may be used to fill the sidewall molds with sidewall compound. A preferred method is to wind a narrow strip of material into the mold until the cross-section is at least partially filled and then to consolidate the winding into a homogeneous filling of the mold. Alternatively a single strip of approximately the cross-section of the sidewall may be laid in a single turn into the sidewall mold and consolidated to ensure the join is flattened. Consolidation is preferably by means of a plate pressed over the mold cavity.

Another method of filling the sidewall mold is to use injection molding. Continuous feed molding may be used or transfer molding in which a premeasured volume of sidewall compound is forced from a chamber into the mold cavity. The mold filling operation may fill the complete annular mold simultaneously or may fill a part of the mold and the filling head or die head is then relatively moved around the mold to produce the complete annular filling of compound.

It will be appreciated that there are no mold induced limitations on the sidewall pattern because of the ease of removal of the tire from the separate sidewall molds and the process is of great advantage for tires having white or other contrasting color sidewall markings.

In the case of contrasting colored sidewall markings the sidewall filling process uses more than one mold filling step and because the sidewalls are not deformed during tire shaping or during final shaping into the curing press, any significant movement of the various components is avoided.

Finally the steps of fitting the sidewalls to the green carcass and placing the carcass in the curing mold may be done at the same time in the tire building process. One sidewall and its associated mold may be placed in the main curing mold, the green carcass minus sidewalls is placed in the mold, the second sidewall and its associated mold is placed onto the carcass and the mold is closed to effect curing.

According to another aspect of the present invention in a tire assembly apparatus a pair of discrete annular tire sidewall molds are provided each including a continuous circular cavity having a surface profiled as a female mold for the required sidewall, means for filling the cavity with uncured sidewall compound and means for positioning the sidewall molds against the sides of a preshaped tire carcass such that the sidewalls become integral with the tire assembly.

A preferred means for filling the cavity of a sidewall mold comprises a feed device for a narrow strip of uncured sidewall compound and means to relatively rotate the feed device and the sidewall mold such that a winding is produced to at least partially fill the mold cavity. Consolidating means, for example a mold closing plate, may also be provided to allow consolidation to form a homogeneous filling of the mold cavity. It is also possible to provide a feed device which feeds into the mold cavity a strip of material having a cross-section shaped to completely fill the annular mold cavity with a single rotation.

Alternatively the means for filling the cavity of the sidewall mold may be an injection molding machine having a die head engageable with the sidewall mold so that the entire sidewall cavity may be filled simultaneously. The injection machine may have a continuous material feed or be a transfer molding machine. An alternative mold filling machine comprises an injection or transfer molding machine which has a die head which is engageable in one part of the annular die and provided with a rotational drive to propel the die head around the annular cavity or more preferably to rotate the mold past the die head to complete filling of the cavity.

The sidewall mold preferably includes means to assist in retaining the compound in the cavity. Suitable means include open passages through the mold or spews which are shaped as retention rings at the edge of the sidewall.

The means for positioning the sidewall molds against the sides of a preshaped tire carcass may be integral with the carcass shaping machine or separate therefrom. In each case the positioning means is preferably mechanical means such as for example a set of cams and levers having adjustable, pre-set stops so that the degree of force applied to the carcass can be accurately set.

In detail, according to one aspect of the invention a method for assembling a vehicle tire comprises:

(a) filling a pair of discrete annular tire sidewall molds with uncured sidewall compound to form two tire sidewalls,
(b) bringing the sidewall molds filled with sidewall compound into sealing engagement with a tire curing mold containing an assembly of a pre-shaped tire carcass and a tread, and leaving a space between each sidewall and the assembly, the sidewall molds becoming parts of the tire curing mold,
(c) removing air from said space, and
(d) moving the sidewall molds so as to position the sidewalls in pressing engagement with the assembly to form a complete unvulcanized tire.

To complete the manufacture the additional steps of:
(e) curing the tire, and
(f) removing the cured tire from the curing mold are required.

Preferably the sidewall molds are brought into sealing engagement with a ring-shaped tread mold and two-ring-shaped bead region molds, said ring-shaped molds comprising parts of the tire curing mold, said space being formed between the tire carcass, the ring-shaped tread mold, the tire sidewall and the respective ring-shaped bead region mold.

Each sidewall mold may be filled with uncured sidewall compound by transfer molding, by winding a strip of said compound into the mold or by laying a single strip of approximately the cross-section of the sidewall in a single turn into the mold. The sidewall compound once in the sidewall mold may be consolidated therein by pressing a mold closure plate onto the uncured sidewall compound.

According to a more limited aspect of the invention a method of assembling a pneumatic tire comprises the steps of:

(i) placing uncured tread compound, uncured undertread compound (if required), at least one breaker ply and uncured underply compound into a molding cavity on the radially inner surface of a ring-shaped tread mold,
(ii) placing a tire carcass radially within the ring-shaped tread mold,
(iii) shaping the tire carcass to bring the crown region thereof into contact with the underply compound,
(iv) filling a pair of sidewall molds with uncured sidewall compound to form two tire sidewalls,
(v) bringing the sidewall molds filled with sidewall compound into sealing engagement with the ring-shaped tread mold and the pair of ring-shaped bead region molds, the tread mold, the pair of sidewall molds and the pair of bead region molds forming a tire curing mold, leaving spaces between the sidewalls and the carcass,
(vi) moving each bead region mold into contact with the respective bead region of the tire carcass,
(vii) connecting the bead region mold to the tire carcass preferably by means of clips,
(viii) removing air from the space between each sidewall and the carcass, and
(ix) moving the sidewall molds to position the sidewalls in pressing engagement with the carcass to form a complete unvulcanized tire.

To complete manufacture to also perform the additional steps of:
(x) curing the tire,
(xi) opening the tire mold, and
(xii) removing the cured tire therefrom, are required.

According to a second aspect of the invention an apparatus for assembling a complete tire comprises:

(a) a tire curing mold including a pair of discrete annular tire sidewall molds each separable from the remainder of the tire curing mold, each sidewall including a molding cavity having a surface profiled as a female mold for the required tire sidewall,
(b) means for filling the cavity with uncured sidewall compound to form a tire sidewall,
(c) means for bringing the sidewall molds into sealing engagement with the remainder of the tire mold containing an assembly of a pre-shaped tire carcass and a tread and leaving a space between each sidewall into the sidewall mold and the assembly,
(d) means for removing the air from the space, and
(e) means for moving the sidewall molds so as to position the sidewalls in pressing engagement with the assembly to form a complete tire.

Preferably the tire curing mold comprises a ring-shaped treat mold and two ring-shaped bead region molds, the sidewall molds each having means for sealing engagement with the tread mold and the respective bead region mold.

Preferably the means for filling the cavity comprises a feed device for a strip of uncured a sidewall compound and means to relatively rotate the feed device and the sidewall mold being filled such that a winding may be laid in the cavity. Alternatively the filling means may be an injection transfer molding device.

The sidewall mold preferably includes means to assist in retaining the compound in the cavity. Suitable means include open passages through the mold or spews which are shaped as retention rings at the edges of the sidewall.

According to a more limited second aspect of the invention an apparatus for assembling a complete tire comprises, in operative combination, (i) a tire curing mold including a ring-shaped tread mold, two sidewall molds and two-ring-shaped bead region molds,
(ii) means for placing uncured tread compound, uncured undertread compound (if required), at least one breaker ply and uncured underply compound into a molding cavity formed on the radially inner surface of the tread mold,
(iii) means for placing a tire carcass radially within the ring-shaped tread mold,
(iv) means for shaping the tire carcass to bring the crown region thereof into contact with the underply compound,
(v) means for filling a pair of sidewall molds with uncured sidewall compound to form two tire sidewalls,
(vi) means for bringing each sidewall mold filled with sidewall compound into sealing engagement with the ring-shaped tread mold and the respective bead region molds, leaving a space between each sidewall and the carcass, (vii) means for moving each bead region mold into engagement with the respective bead region of the carcass, (viii) means for removing air from the space between each sidewall and the carcass, (ix) means for moving the sidewall mold to position the sidewalls into pressing engagement with the carcass to assemble a complete unvulcanized tire.

BRIEF DESCRIPTION OF THE DRAWINGS

Further aspects of the present invention will become apparent from the following description, by way of example only, of various embodiments in which.

DETAILED DESCRIPTION OF THE INVENTION

Figure 1:
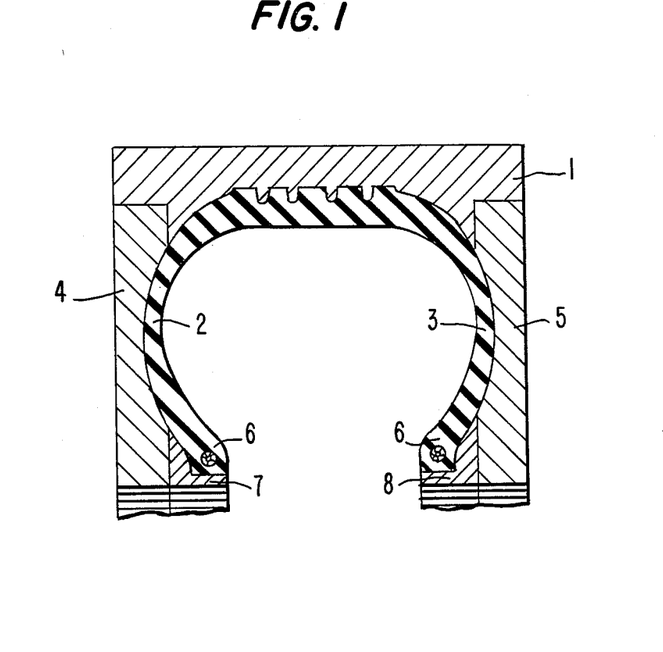
FIG. 1 is a cross-section of a part of a circular tire mold including sidewall molds according to the present invention.

The tire curing mold assembly shown in FIG. 1 is conventional and comprises a tread molding segment 1, which is one of a series, which is joined end-to-end to form the complete circular tire tread mold. The segments 1 are mounted in the curing mold so that they are movable radially inwards and outwards to allow insertion of a green carcass and subsequent removal of the cured tire. The interior of the tire is pressurized and the complete tire is heated by a curing diaphragm or curing bag (not shown) which is inflated usually by steam or hot liquid within the tire. The sidewalls 2 and 3 are molded by sidewall molds 4 and 5 which are a novel feature of the present invention. The sidewall molds 4 and 5 which carry sidewalls only as discrete components are detachable from the main mold segments 1 and the bead regions 6 are shaped by clip rings 7 and 8.

Figure 2:
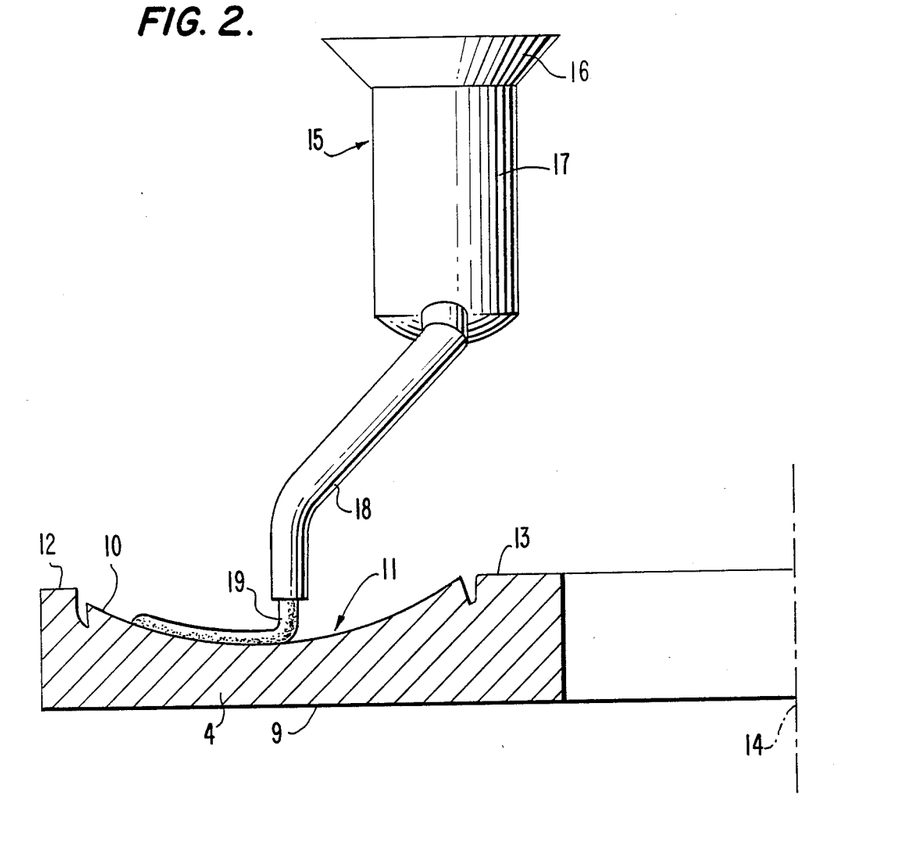
FIG. 2 shows one method of filling a sidewall mold of FIG. 1.

As shown in FIG. 2 a sidewall mold 4 comprises an annular ring which has one of its end surfaces 9 plain and the other end face 10 is shaped to provide a female mold cavity 11 for the required tire sidewall which is made in and carried by the sidewall mold. The mold cavity 11 includes the sidewall pattern, identification markings and Trade Marks. On either side of the mold cavity 11 there are smooth, unpatterned, circular mold sealing surfaces 12 and 13.

One method of filling and sidewall mold cavity 11 is shown in FIG. 2. The sidewall mold 4 is mounted horizontally so that it may be rotated about an axis 14 beneath a tire sidewall compound supply device 15. The compound supply device 15 comprises a hopper 16 and an extrusion head 17 and a feed tube 18. The supply device 15 provides a narrow rectangular section extrudate 19 of tire compound and the feed tube 18 is arranged so that the strip 19 is laid into the mold cavity 11. The mold 4 is rotated so that the strip 19 is wound around within the annular mold cavity until the cavity is filled by the winding. Means, not shown, are provided to move the feed tube 18 from side-to-side of the mold cavity, i.e., in the radial direction of the mold 11, so that the winding of the strip 19 fills the cavity to a level slightly higher than that required for the sidewall section. It should be appreciated that the arrangement is schematic and the extrusion head 17 need not be immediately above the mold as shown but can be remote with a carrying system of guides for the strip 19 of material.

Figure 3:
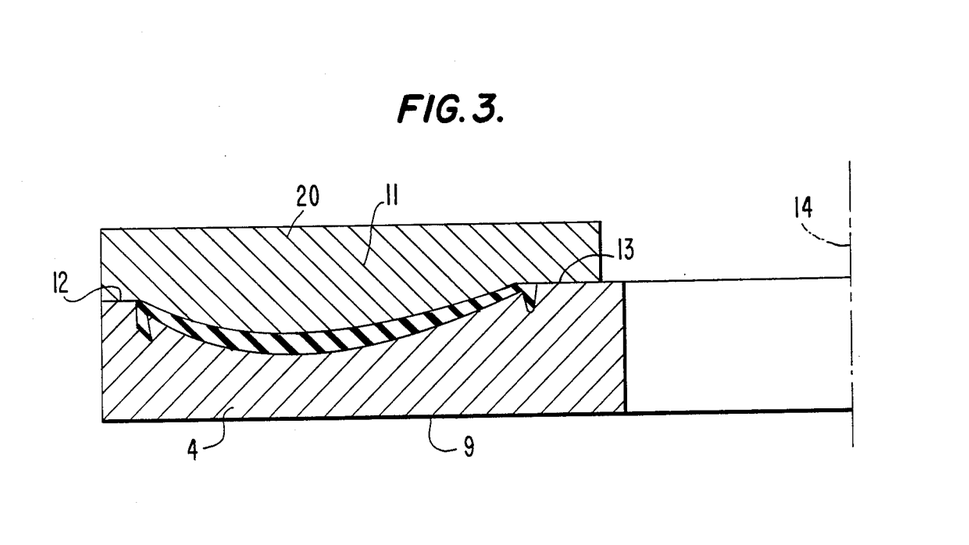
FIG. 3 shows a method of consolidating the filling in the tire mold from FIG. 2.

FIG. 3 shows a second stage in the mold filling process which comprises bringing a consolidation plate 20 into contact with the top surface of the winding so as to consolidate the winding into a homogeneous mass having the desired cross-section. The plate 20 is conveniently provided in the same machine as the filling device 15 and is pressed against the rotatably mounted tread mold so as to completely enclose the sidewall being molded except for small air release passages.

Figure 4:
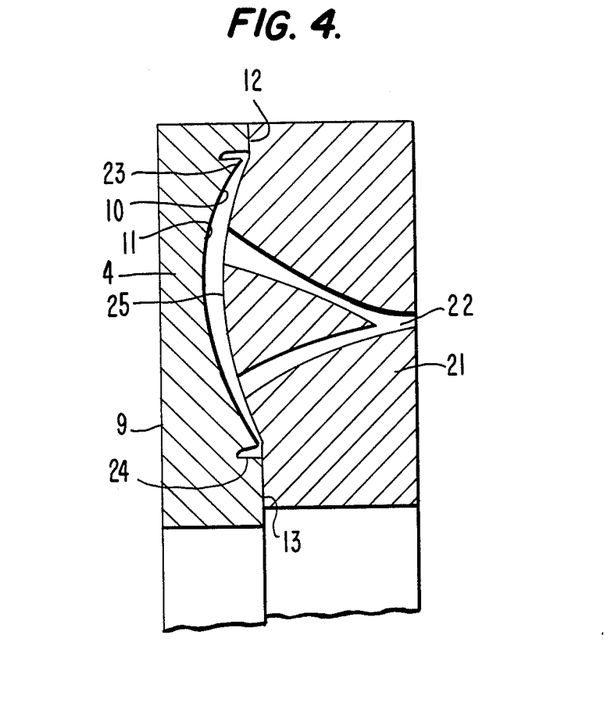
FIG. 4 shows an alternative tire filling system to that of FIG. 2.

An alternative mold cavity filling device is shown in FIG. 4 and comprises a ring-shaped extrusion die head 21 having mating sealing surfaces to engage the mold sealing surfaces 12 and 13 and it is engaged with the sidewall mold 4 so as to define the filling sidewall mold cavity. The die head 21 includes feed ports 22 to feed extrusion material to the cavity 11 and a source of pressurized compound, not shown, is connected to the feed ports 22. The sidewall mold 4 also includes narrow grooves 23 and 24 one of which extends around the inner edge of the mold cavity 11 and the other extends around the outer edge. These grooves provide re-entrant portions for the mold edges.

Both methods produce a filling for the mold cavity 11 in the required shape for the sidewall and may optionally include in additional spews of material at the edges which are engaged in the narrow grooves 23 and 24. These are not essential but are preferred particularly in the case of the second filling method when an extrusion die is used and as the die head 21 is removed from the mold cavity 11 sticking of the material of the sidewall to the surface 25 can occur. Two sidewalls are formed one in each of a pair of molds 4 and 5 and these are then taken into a tire shaping machine and loaded one at either side of the machine in the manner conventional for bead hoops. At the appropriate time in the tire building operation when the tire carcass has been shaped and the tread rubber fitted, the sidewall molds are moved axially inwards to fit the tire sidewalls to the carcass and complete the tire assembly.

The tire is then carried by means of the sidewall molds 4 and 5 to the curing press where the molds 4 and 5 are put in the press with the tire as shown in FIG. 1 and previously explained. After curing the sidewall molds 4 and 5 are removed and the spews are cut off.

If desired the sidewall molds 4 and 5 may be attached to the green carcass at the molding stage in which case the green carcass is assembled prior to molding without sidewalls.

When white sidewalls or white sidewall lettering is required these may be molded into the sidewall mold by using a different die head 14 to position the white compound as required and then a second stage of injection molding to form the remainder of the sidewall cross-section in normal black sidewall compound.

An important advantage of the present invention is that it may be applied to otherwise conventional tire building processes changing only the time at which the sidewalls are fitted from before shaping to after shaping.

Turning now to FIGS. 5-10, there is shown a ring-shaped tire mold in a series of sectional views to illustrate the various stages of the tire assembly process.

Figure 10:
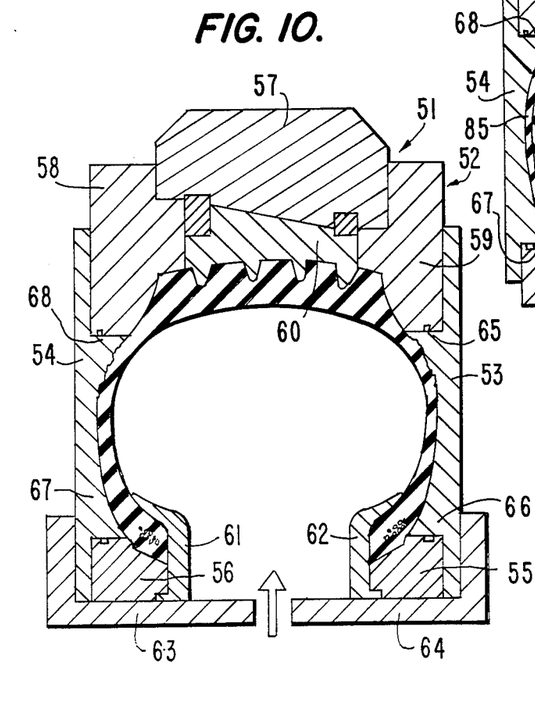

As shown in FIG. 10, the apparatus for assembling a tire comprises a tire curing mold 51 including a ringshaped tread mold 52, two sidewall molds 53, 54 and two ring-shaped bead region molds 55, 56. The ring-shaped tread mold 52 itself comprises a plurality of separable parts 57, 58 59, 60 including a ring of tread molding segments 60. In addition to the tread molding ring 52, the sidewall molds 53, 54 and the bead region molds 55, 56, the apparatus also comprises a plurality of clips 61, 62, and rings 63, 64 for supporting the clips, the bead region molds and the sidewall molds. Air-tight seals 65, 66, 67, 68 are provided between most of the mating surfaces especially between the two sidewall molds where they engage firstly the tread mold and secondly the bead region molds.

Figure 5:
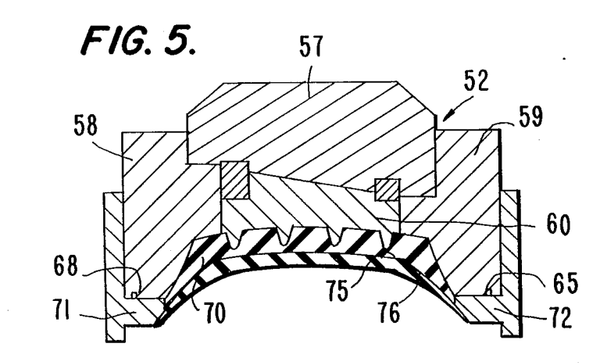
FIGS. 5-10 are sectional views through all or part of a ring-shaped tire curing mold showing various stages of the tire assembly process.

To build a tire, a layer of unvulcanized tread rubber compound 70 is placed within the ring-shaped mold as shown in FIG. 5 which is held together by means of two additional side rings 71, 72. Following this a layer of under tread rubber compound (if required) (not shown in the drawings) and one or more breaker plies 75 as required and a layer of under ply rubber 76 is positioned radially within the tread rubber compound. This stage is illustrated in FIG. 5. Preferably the method and apparatus used for this stage is as described in U.S. patent application Ser. Nos. 576,578, now U.S. Pat. Nos. 4,597,728, and 566,992.

Figure 6:
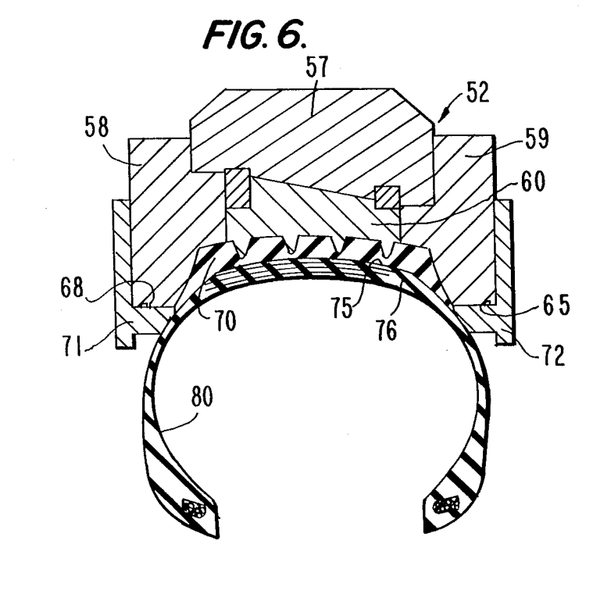

A tire carcass 80 is built in conventional manner by laying various plies etc. on a tire building drum and transferring the tire carcass to a shaping drum (not shown), moving the drum to a position radially within the tread mold and shaping the carcass from a cylindrical form to a toroidal form to bring the crown region of the carcass into engagement with the radially inner surface of the under tread rubber. This is shown in FIG. 6.

Figure 7:
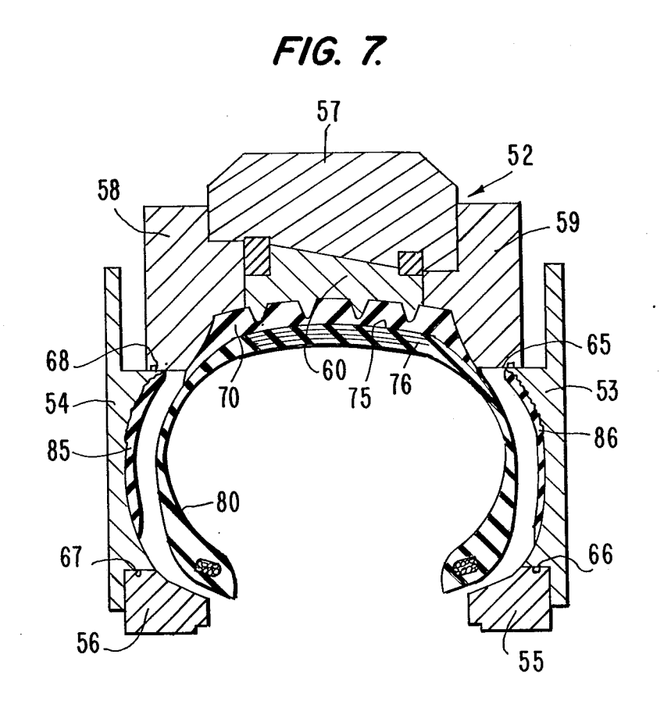

The two sidewall molds 53, 54 are then each filled with sidewall rubber compound, the sidewalls 85, 86 being formed into the shape they will have in the completed tire. The sidewall molds may be filled by various alternative means, e.g., strip winding or transfer molding as described above. The sidewall molds 53, 54 are then placed in position as shown in FIG. 7 (the rings illustrated in FIGS. 5 and 6 having been removed). The bead region molding rings 55, 56 are also assembled with the sidewall molds. This stage is illustrated in FIG. 7 of the accompanying drawings.

Figure 8:
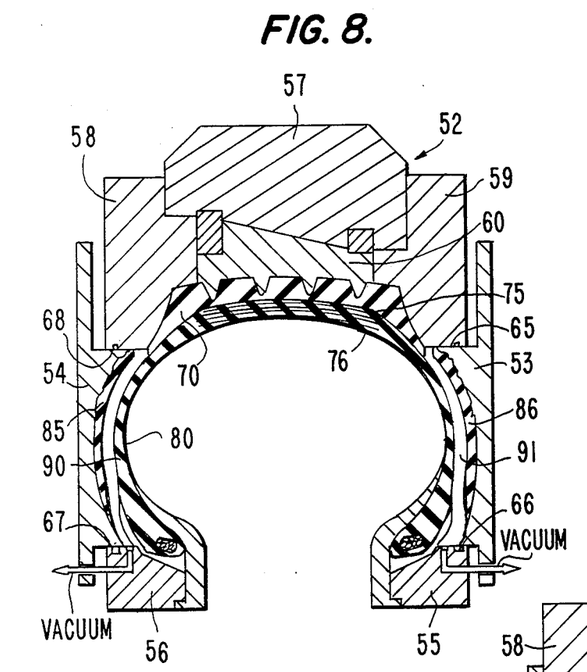

The bead region molding rings 55, 56 are then moved axially inwards to contact the outer surfaces of the bead regions of the tire carcass 80 and clipped thereto by means of a plurality of clips 61, 62. As can be seen in FIG. 8, sealed spaces 90, 91 are left between the interior surface of the sidewall in the sidewall molds, the outer surfaces of the tire carcass, the radially inner surface of the tread molding ring and the radially outer surfaces of the two bead region molding rings. Each space is sealed by means of the seals 65, 66, 67, 68. Air from each space is then pumped out by connecting a vacuum pump to the mold. This is shown in FIG. 8.

Figure 9:
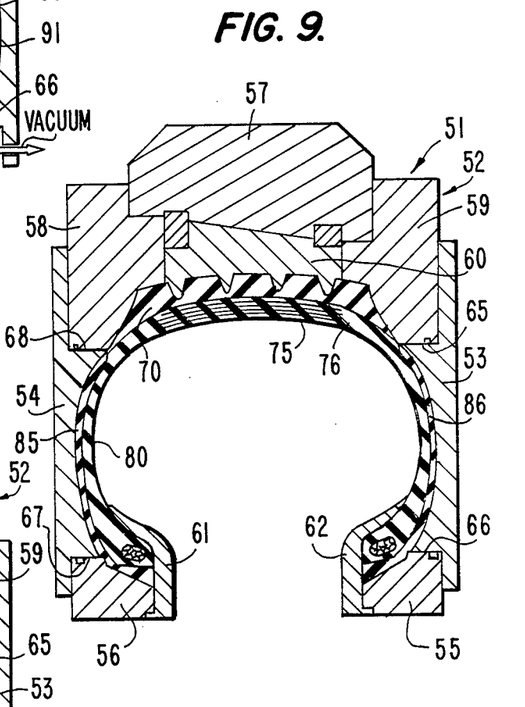

As described earlier herein, means may be provided in the sidewall mold to prevent the sidewall rubber from moving while the space is being evacuated. These means are preferably small channels at the radially inner and outer edges of the sidewall molds, into which rubber compound can flow. When the air has been removed from between the tire sidewalls (held in the molds) and the respective sides of the carcass, the sidewall molds are moved axially inwards. It will be noticed that this also cuts off the space from the connection to the vacuum pump. The sidewalls are pressed into contact with the sides of the tire carcass as can be seen in FIG. 9.

The complete tire is thus assembled and it will be noticed that the sidewalls once they are formed in the sidewall molds are not further shaped or distorted in any way during the subsequent process steps. This, together with the fact that the air is removed from between the sidewall rubber and the sides of the carcass, means that the number of blemishes appearing on a tire sidewall is substantially reduced.

To cure the tire further rings 63, 64 are added to the tire mold as shown in FIG. 10 and an annular curing bag (not shown) placed inside the tire. This is pressurized with hot fluid and the mold heated to effect vulcanization of the tire. The mold is then opened and the tire removed. Various parts of the apparatus, e.g., means for moving the tire sidewall molds and bead region molds from the positions shown in FIG. 7 to that shown in FIGS. 8 and 9 are not disclosed in detail since any suitable means well knowqn to those persons skilled in the tire manufacturing art can be utilized.

We claim:
1. A method for assembling a vehicle tire comprising:
 (a) filling a pair of discrete annular tire sidewall molds with uncured sidewall compound to form two tire sidewalls, said filling being done where the sidewall molds are separated from any other mold components, said sidewall mold having generally axially extending sealing surfaces;
 (b) bringing the sidewall molds filled with sidewall compound into sealing engagement with a tire curing mold having mating generally axially extending sealing surfaces and containing an assembly of a pre-shaped tire carcass and a tread, retaining each sidewall mold in sealing engagement with the tire curing mold by means of said sealing surfaces while holding each sidewall therein in spaced relationship with the tire carcass to define a cavity therebetween;
 (c) then pumping air from said cavity, and
 (d) moving the sidewall molds so as to position the sidewalls in pressing engagement with the assembly to form a complete unvulcanized tire.

2. A method of assembly a pneumatic tire comprising the steps of:
 (a) placing an uncured tread compound, and at least one breaker ply and uncured underply compound into a molding cavity on the radially inner surface of a ring-shaped tread mold;
 (b) placing a tire carcass radially within the ring-shaped tread mold;
 (c) shaping the tire carcass to bring the crown region thereof into contact with the underply compound;
 (d) filling a pair of sidewall molds with uncured sidewall compound to form two tire sidewalls, said filling being done when the sidewall molds are separated from said tread mold, said sidewall mold having generally axially extending sealing surfaces;
 (e) bringing the sidewall molds filled with sidewall compound into sealing engagement with the ring-shaped tread mold having mating generally axially extending sealing surfaces and a pair of ring-shaped bead region molds, the tread mold, the pair of sidewall molds and the pair of bead region molds forming a tire curing mold, retaining each sidewall mold in sealing engagement with the tire curing mold by means of said sealing surfaces while holding each sidewall therein in spaced relationship with the tire carcass to define a cavity therebetween;

(f) moving each bead region mold into sealing engagement with the respective bead region of the tire carcass;

(g) connecting the bead region mold to the tire carcass by means of clips;

(h) pumping air from said cavity between each sidewall and the carcass, and (i) moving the sidewall molds to position the sidewalls in pressing engagement with the carcass to form a complete unvulcanized tire.

3. A method of assembling a tire according to claim 1, wherein such sidewall mold is filled with compound by transfer molding.

4. A method of assembling a tire according to claim 1, wherein each sidewall mold is filled with sidewall compound by winding a strip of material into the mold until the cross-section is at least partially filled and then consolidating the winding into a homogeneous mass.

5. A method of assembling a tire according to claim 1, wherein each sidewall mold is filled with sidewall compound by means of laying a single strip of approximately the cross-section of the sidewall in a single turn into the mold.

6. A method of assembling a tire according to claim 1, wherein the sidewall mold after filling has the sidewall compound consolidated by means of a mold closure plate which is pressed against the filled mold.

7. A method of manufacture of a pneumatic tire including the steps of:

forming a tread in a tread mold and assembling thereto a shaped tire carcass;

forming, separated from the tread, a pair of uncured rubber sidewalls each in discrete annular sidewall molds by filling said sidewall molds with uncured sidewall compound, said sidewall molds having generally axially extending sealing surfaces;

bringing each sidewall mold filled with compound into sealing engagement with a tire curing mold having mating generally axially extending sealing surfaces and which incorporates said tread mold;

retaining the sidewall molds in sealing engagement with the tire curing mold by means of said sealing surfaces;

holding the sidewalls in said sidewall molds in spaced relationship from the carcass to define a cavity therebetween, pumping air from said cavities; and the moving said sidewalls into engagement with the carcass assembly.

8. A method as claimed in claim 7, wherein the tire curing mold includes said tread mold, and a pair of ring shaped bead portion molds which are held in contact with the respective bead regions of the tire carcass, and each sidewall mold is in sealing engagement with both the tread mold and the respective bead portion mold, prior to the removal of air from between the sidewall and the carcass.

9. A method as claimed in claim 8, wherein each sidewall mold when moved so as to press the respective sidewall to the carcass, will then form part of the tire curing mold.

10. Apparatus for assembly of a green tire comprising a tire curing mold including a tread mold, a pair of discrete sidewall molds which are each separable from the tread mold and which are each sealingly engageable with the remainder of the tire curing mold by means of generally axially extending sealing surfaces so that a sidewall formed therein can be held spaced from the carcass while in a sealing relationship, means for filling the sidewall molds with sidewall compound when they are separated from the tread mold to form an uncured sidewall, means for bringing the sidewall molds with compound therein into sealing engagement with the tire curing mold having a shaped tire carcass and tread contained within the tread mold, means for holding the sidewall molds in said sealing engagement, with the sidewalls therein in spaced relationship with the carcass and defining cavities therebetween, and means for pumping air from said cavities defined between the carcass and the sidewalls when the sidewall molds are sealingly engaged with the tire curing mold prior to placement of the sidewalls against the carcass.

11. Apparatus as claimed in claim 10, in which the tire curing mold also includes a pair of bead portion molds and means for moving the bead region molds into engagement with the respective bead portions of the carcass, said sidewall molds each being sealingly engageable with both the tread mold and a respective bead portion mold.

12. An apparatus for assembling a complete tire comprising:

(a) a tire curing mold including a pair of discrete annular tire sidewall molds each separable from the remainder of the tire curing mold, each sidewall mold including a molding cavity having a surface profiled as a female mold for the required tire sidewall and generally axially extending sealing surfaces between said sidewall mold and the remainder of the tire curing mold so that the sidewall mold can be axially moved into and out of a closed position and to seal between them so that a sidewall formed in said sidewall mold can be held spaced from the remainder of the mold while in sealing relationship;

(b) means positioned adjacent a sidewall mold for filling the cavity thereof with uncured sidewall compound to form a tire sidewall when the sidewall mold is separated from the remainder of the mold;

(c) means for bringing the sidewall molds into sealing engagement with the remainder of the tire mold containing an assembly of a pre-shaped tire carcass and a tread and holding the sidewall mold to form a cavity between each sidewall in the sidewall mold and the assembly;

(d) means for pumping air from each cavity; and (e) means for moving the sidewall molds so as to position the sidewalls in pressing engagement with the assembly to form a complete tire.

13. A tire assembly apparatus according to claim 12, wherein the means for filling the cavity comprises a feed device for a strip of uncured sidewall compound and means to relatively rotate the feed device and the sidewall mold such that a winding may be laid into the cavity.

14. An apparatus for assembling a complete tire comprising, in operative combinations:

(a) a tire curing mold including a ring-shaped tread mold, two sidewall molds and two ring-shaped bead region molds and generally axially extending sealing surfaces between said sidewall molds and said tread mold and bead region mold so that the sidewall mold can be axially moved into and out of a closed position and to seal between them so that a sidewall formed in each sidewall mold can be held spaced from said tread mold while in sealing relationship;

(b) means for placing uncured tread compound, at least one breaker ply and uncured underply compound into a molding cavity formed on the radially inner surface of the tread mold;

(c) means for placing a tire carcass radially within the ring-shaped tread mold;

(d) means for shaping the tire carcass to bring the crown region thereof into contact with the underply compound;

(e) means for fillling a pair of sidewall molds with uncured sidewall compound to form two tire sidewalls when said sidewall molds are separated from said tread mold;

(f) means for bringing each sidewall mold filled with sidewall compound into sealing engagement with the ringshaped tread mold and the respective bead region molds and holding each sidewall mold to form a cavity between each sidewall and the carcass;

(g) means for moving each bear region mold into engagement with the respective bead region of the carcass;

(h) means for pumping air from the cavity between each sidewall and the carcass; and (i) means for moving the sidewall mold to position the sidewalls into pressing engagement with the carcass to assemble a complete unvulcanized tire.

* * * * *